UNITED STATES PATENT OFFICE.

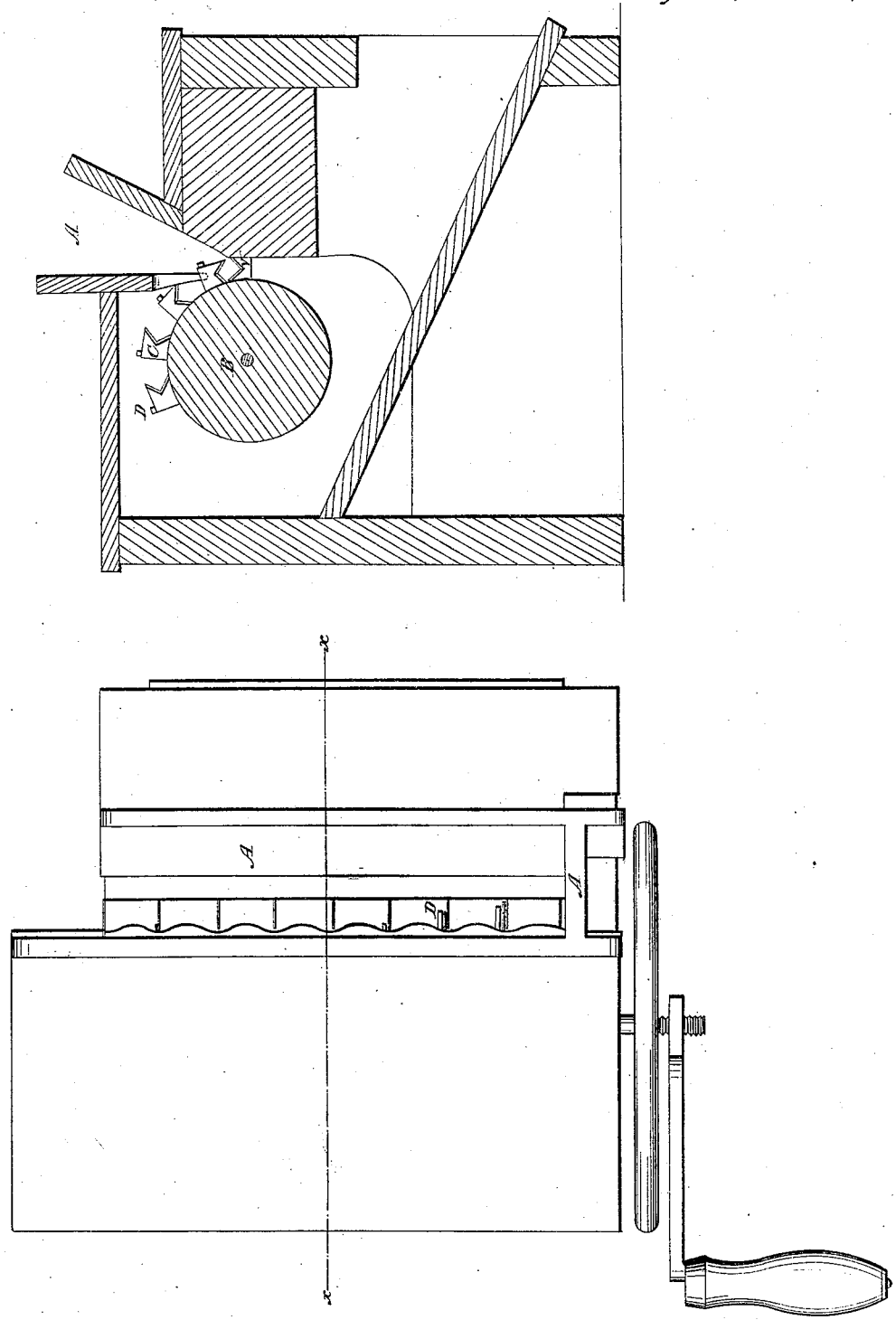

ELI ODELL, OF WINTERSET, IOWA.

IMPROVEMENT IN STRAW-CUTTERS.

Specification forming part of Letters Patent No. 38,120, dated April 7, 1863.

*To all whom it may concern:*

Be it known that I, ELI ODELL, of the city of Winterset, Madison county, and State of Iowa, have invented a new and Improved Method or Machine for Cutting Straw; and I do hereby declare that the following is a full and exact description thereof, reference being had to the accompanying drawings, and to the letters of reference marked thereon.

The nature of my invention consists in the manner or mode of feeding and cutting straw, the straw being placed in a hopper and fed sidewise instead of endwise, and cut by a number of knives or cutters placed on a cylinder, which match to a set of stationary knives or cutters, each set or pair of cutters making but one cut at a time, the cutters being of such a shape as to gage and hold the amount of straw desired to be cut with each pair of knives. The straw when cut runs out of a spout below, if desired, into a feed box.

To enable others skilled in the art to make and use my invention, I will proceed to describe its construction and operation.

I construct a box or frame, E, with hopper A to receive the straw. Within this box I place a cylinder, B, to which is attached a balance-wheel and crank. The stationary cutters, which are shaped on the cutting-edge like the letter V, by which letter they are represented in the drawings, are placed at the bottom of the hopper A in a horizontal line with edges upward, and at such distance apart as desired to gage the length the straw is to be cut. Upon the cylinder B are placed one or more rows of knives or cutters C, in a spiral form, their edges being reversed, so as to match the stationary knives or cutters, and of such length or size as to gage the amount of straw to be cut at a clip. Extending along one side of these and a little distance out from their ends is a small pin, D, which is for the purpose of cleaning the cut straw from the machine, and thus prevent it from choking.

At one revolution of the cylinder as many clips will be made as there are knives or cutters in the cylinder. For instance, if the cylinder is three feet long, and the knives in it are placed one inch apart, and there is but one row of knives, then at one revolution thirty-six cuts will be made, and if there are two rows of knives in the cylinder then it will make seventy-two cuts at a revolution, and so on, and if placed nearer, the cuts are still more rapid.

In order that the rapidity with which this machine cuts may be fully appreciated, I will make one other estimate: Let the cylinder be thirty-six inches long, and the knives one inch apart, and suppose that it revolves once per second, which is practicable by hand, then, of course, there would be thirty-six cuts per second, and two thousand one hundred and sixty per minute; and if two rows of knives, then it makes four thousand three hundred and twenty cuts per minute, and if the knives are placed one-half inch apart it will make eight thousand six hundred and forty cuts per minute, and so on.

What I claim as my invention, and desire to secure by Letters Patent, is—

The arrangement of a series of knives in a spiral form, mounted on a cylinder in a horizontal position, and said knives so reversed as to work in combination and match with the stationary cutters V on the bottom of the hopper, for the purpose herein set forth and described.

ELI ODELL.

Witnesses:
 B. F. ROBERTS,
 JAMES SHEPHERD.